United States Patent [19]

Evans

[11] 4,415,973

[45] Nov. 15, 1983

[54] ARRAY PROCESSOR WITH STAND-BY FOR REPLACING FAILED SECTION

[75] Inventor: Colin Evans, Stevenage, England

[73] Assignee: International Computers Limited, London, England

[21] Appl. No.: 243,999

[22] Filed: Mar. 16, 1981

[30] Foreign Application Priority Data

Mar. 28, 1980 [GB] United Kingdom ............... 8010575

[51] Int. Cl.³ .......................................... G06F 15/16
[52] U.S. Cl. ................................................... 364/200
[58] Field of Search ... 364/900 MS File, 200 MS File

[56] References Cited

U.S. PATENT DOCUMENTS

| | | | |
|---|---|---|---|
| 3,287,703 | 11/1966 | Slotnick | 364/200 |
| 3,409,877 | 11/1968 | Alterman et al. | 364/900 |
| 3,812,469 | 5/1974 | Hauck et al. | 364/200 |
| 3,979,728 | 9/1976 | Reddaway | 364/200 |
| 4,001,790 | 1/1977 | Barlow | 364/200 |
| 4,020,469 | 4/1977 | Manning | 364/900 |
| 4,035,770 | 7/1977 | Sarle | 364/900 |
| 4,146,929 | 3/1979 | Troughton et al. | 364/900 |
| 4,247,892 | 1/1981 | Lawrence | 364/200 |

Primary Examiner—Gareth D. Shaw
Assistant Examiner—Daniel K. Dorsey
Attorney, Agent, or Firm—Lee, Smith & Jager

[57] ABSTRACT

An array processor consisting of a plurality of sections (S1, S2–S9), with switching means (24,26,30,32) selectively operable to by-pass any one of the sections so as to effectively remove it from the system. One of the sections normally acts as a stand-by, and is by-passed. However, if one of the other sections fails, that section is by-passed and the stand-by is returned to service. The currently active sections are allocated sequential addresses.

3 Claims, 5 Drawing Figures

ARRAY PROCESSOR WITH STAND-BY FOR REPLACING FAILED SECTION

BACKGROUND TO THE INVENTION

This invention relates to a data processing system of the kind comprising a plurality of data processing elements connected together in an array such that each element can transfer data to its nearest neighbours. Such a system is described for example in British Patent Specifications Nos. 1445714, 1536933, 2020457 and 2019620.

An important consideration in the design of data processing systems is that of maintaining availability in the event of failure of a part of the system. One known method of doing this is to provide a stand-by unit which can be automatically switched-in to replace any failed unit. However, such a technique is difficult to apply in the case of a processing system of the kind referred to above, since a large number of switching circuits would be necessary to enable a stand-by processing element to be switched-in to replace any one of the processing elements.

The object of the present invention is therefore to provide a way of avoiding this difficulty.

SUMMARY OF THE INVENTION

According to the invention there is provided a data processing system comprising a plurality of processing elements connected together in an array such that each element can transfer data to its nearest neighbours, the elements being grouped into sections, each section containing a plurality of elements, and switching means selectively operable to by-pass any one of the sections so as to effectively remove that section from the array.

In a system in accordance with the invention, one of the sections normally acts as a stand-by, and is by-passed by the switching means. However, if one of the sections fails, that section is by-passed, and the by-passing of the stand-by section is removed so as to return the stand-by to normal operation.

BRIEF DESCRIPTION OF THE DRAWINGS

One data processing system in accordance with the present invention will now be described, by way of example, with reference to the accompanying drawings, of which.

DESCRIPTION OF THE PREFERRED EMBODIMENT OF THE INVENTION

Figure 1:
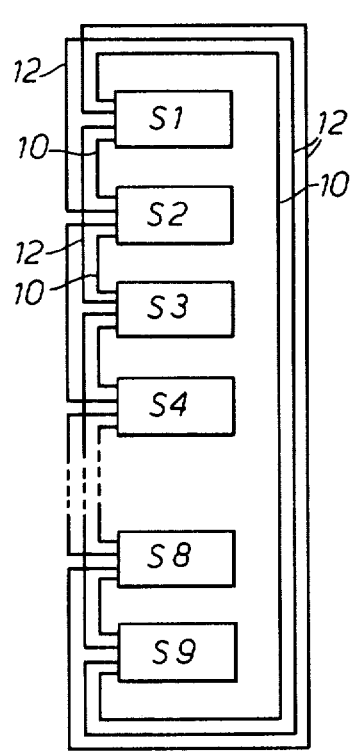
FIG. 1 is an overall view of the system, showing the interconnections between the sections.

FIG. 1 shows a data processing system comprising nine sections S1–S9. Each adjacent pair of sections is interconnected by means of a 128-line path 10. The sections are considered as being arranged cyclically, and so the last section S9 is connected by a path 10 to the first section S1. In addition to the paths 10, there are also by-pass paths 12 which connect each pair of sections separated by one section e.g. sections S1 and S3, S2 and S4 and so on. Again, because of the effectively cyclic arrangement, S8 is connected by a by-pass path 12 to S1, and S9 is connected by a by-pass path to S2.

In operation, when all the sections are working normally, any one of the sections (S6, say) serves as a stand-by, and is effectively removed from the system by means of the by-pass path 12 between its neighbours (S5 and S7). The remaining eight active sections are connected together by way of the paths 10 to allow data to be transferred between them. If any one of the active sections fails, this section can then be removed from the system by means of the by-pass path 12 between its neighbours and the stand-by section connected back into the system. The system can then continue operating while the failed section is tested and repaired.

It should be noted that the stand-by section is not substituted into the same position as the failed section, but is simply re-connected into its own position in the sequence. This involves considerably less switching logic than would be required to substitute the stand-by unit at any position in the sequence.

Figure 2:
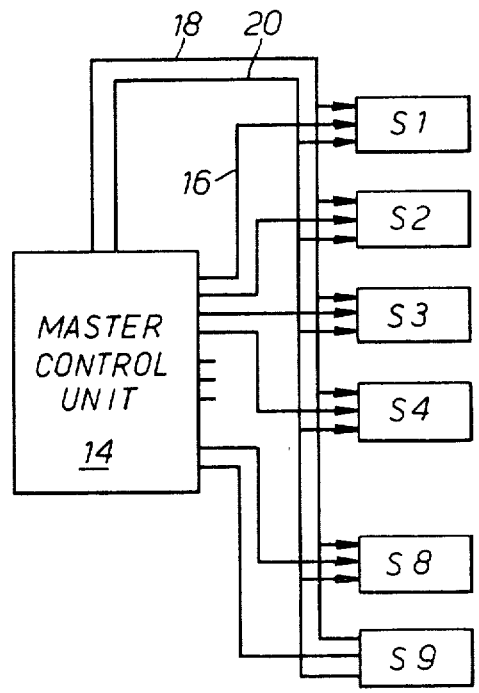
FIG. 2 is another overall view of the system, showing the connections between the master control unit and the sections.

Referring to FIG. 2, the system has a master control unit 14, which sends a set of six configuration control signals to each section over lines 16. There is a separate set of lines 16 for each section, so that each section receives a different set of configuration control signals. The six configuration control signals are as follows:

Q3, Q2, Q1: These three signals define the logical address of the section. They have significance only for the eight currently active sections, not for the section which is currently removed from the system. The logical addresses are always allocated to the active sections in the same sequence.

R: this signal is 0 for the currently active sections and is 1 for the section which is currently removed from the system.

B1,B2: these two signals are used to inform the two neighbours of the section which is currently removed from the system that they must use the by-pass path 12 rather than the normal paths 10 to that section. Both are normally 0, but B1 is set to 1 for the section above the removed section and B2 is set to 1 for the section below the removed section.

As an example, in the case where section S6 is acting as a stand-by, the values of the configuration control signals sent to the nine sections would be as follows:

|    | Q3 | Q2 | Q1 | R | B1 | B2 |
|----|----|----|----|---|----|----|
| S1 | 0  | 0  | 0  | 0 | 0  | 0  |
| S2 | 0  | 0  | 1  | 0 | 0  | 0  |
| S3 | 0  | 1  | 0  | 0 | 0  | 0  |
| S4 | 0  | 1  | 1  | 0 | 0  | 0  |
| S5 | 1  | 0  | 0  | 0 | 1  | 0  |
| S6 | X  | X  | X  | 1 | 0  | 0  |
| S7 | 1  | 0  | 1  | 0 | 0  | 1  |
| S8 | 1  | 1  | 0  | 0 | 0  | 0  |
| S9 | 1  | 1  | 1  | 0 | 0  | 0  |

The master control unit 14 also has an output address bus 18 and an output data bus 20. Both buses 18 and 20 are connected to all the sections in parallel. The address bus carries a seven-bit address I0–I6, while the data bus carries 128 data bits D0–D127.

Figure 3:
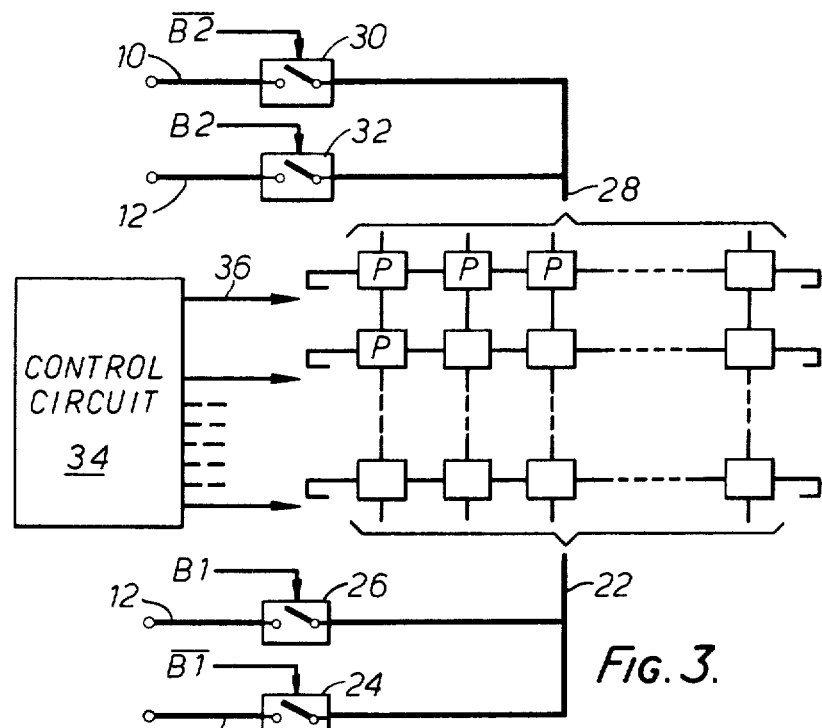
FIG. 3 shows one of the sections in greater detail.

FIG. 3 shows one of the sections S1–S9 in more detail. The section contains 2048 processing elements P arranged in 16 rows of 128 elements. Each element P may be as described in the above mentioned published patent specifications and so will not be described further in this specification.

Since there are 16 rows in each section, there is a total of 128 rows in the eight currently active sections. Each of these currently active rows is allocated a seven-bit address, the three most significant bits of which are provided by the configuration control signals Q3, Q2, Q1 of the section (and are therefore variable) and the four least significant bits of which specify the position of the row within the section (and are therefore fixed for a given row).

As shown in FIG. 3, each element P is connected to its four nearest neighbours in the north, east, south and west directions, to allow transfer of data between them in any direction. (The terms "north", "east", "south" and "west" are used in this specification merely to describe the logical relationships between the elements and should not be taken to imply any particular physical arrangement.) The elements in the eastern edge are also connected to those on the western edge, so that each row is connected cyclically.

The elements on the southern edge are connected to a 128-line path 22. This path can be connected to the data path 10 leading to the southern adjacent section, by way of a switch 24, or alternatively can be connected to the southward by-pass path 12, by way of a switch 26. The switches 26 and 24 are activated by the configuration control signal B1 and its inverse B1 respectively.

Similarly, the elements along the northern edge are connected to a 128-line path 28 which can be connected, by way of switches 30 and 32, either to the path 12 leading to the northern neighbour, or to the northward by-pass path 12. The switches 32 and 30 are activated by the configuration control signal B2 and its inverse B2 respectively.

Although the switches 24, 26, 30, 32 are shown symbolically as mechanical switches, in practice they are electronic switches constructed in a conventional manner from known logic components.

Each section also contains a control circuit 34 having sixteen output lines 36, one for each row of the section. Each of these lines is connected to every processing element P in the row. The lines 36 have two functions.

In a first mode of operation, the lines 36 may be used to select one of the rows to perform a particular function (e.g. to receive data). The row selected is the one whose logical address matches the address I0–I6 on the address bus 18.

In a second mode of operation, the lines 36 may be used to write a 128-bit word of data into the array of processing elements. In this case, the 128 data bits D0–D127 are fed to the 128 currently active rows of the array.

Figure 4:
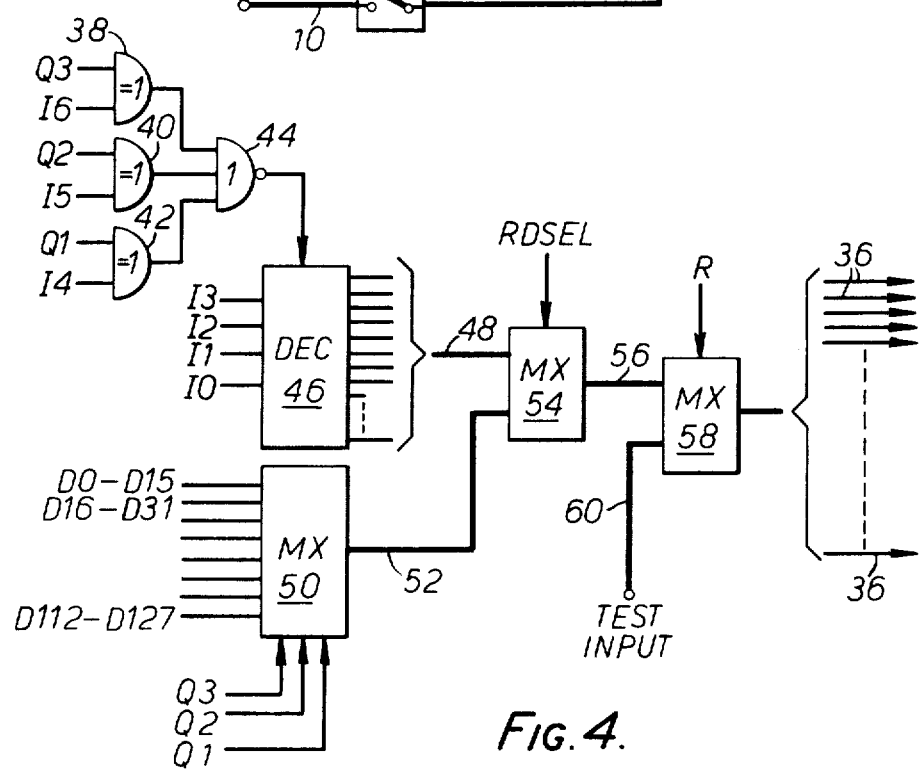
FIG. 4 shows the control ciruit of one of the sections in greater detail.

FIG. 4 shows one of the section control circuits 34 in detail. In this circuit, the configuration control signals Q3, Q2, Q1 are compared in respective exclusive −OR gates 38–42 with the three most significant address bits I6–I4. The outputs of the exclusive −OR gates are combined in a NOR gate 44. It can be seen that the output of the NOR gate 44 is 1 only if Q3=I6, Q2=I5 and Q1=I4. If there is any mismatch between the three address bits and the three Q bits, the output of the NOR gate is 0.

The output of the NOR gate is used to enable a decoder 46 which decodes the four least significant address bits I3–I0 to produce a signal on the corresponding one of sixteen output lines 48.

The control circuit 34 also includes a multiplexer 50 which is controlled by the configuration control signals Q3,Q2,Q1 so as to select one of eight groups of 16 inputs.

These inputs are connected to the data highway 20 to receive the 128 data bits D0–D127 from the master control unit. The selected group of data bits appears on a set of sixteen output lines 52.

The output lines 52 are applied to one set of inputs of a multiplexer 54, the other set of inputs of which are connected to the lines 48. The multiplexer 54 is controlled by a signal RDSEL which is broadcast by the master control unit to all the sections of the array. The output of the multiplexer 54 is a set of sixteen lines 56.

The lines 56 are applied to one set of inputs of another multiplexer 58, the other set of inputs of which are connected to a set of test data inputs 60. The multiplexer 58 is controlled by the configuration control signal R. The sixteen output lines from the multiplexer 58 are connected to respective ones of the sixteen row input lines 36 of the section.

The operation of the section control circuit 34 is as follows. When the section is effectively removed from the system, the configuration control bit R is set to 1, and so the sixteen row input lines 36 are connected, by way of the multiplexer 58, to the test inputs 60, to allow the section to be tested. Normally, however, R is set to 0, and so the row input lines 36 receive the sixteen signals on the paths 56.

In the first mode of operation mentioned above, the control signal RDSEL is set to 0 and so the multiplexer 54 selects the output of the decoder 46. This decoder is enabled only if the address of the section matches the most significant bits I6–I4 of the address of desired row. It can be seen that, in this mode, only the one of the 128 rows whose logical address matches the input address I6–I0 has its row input line 36 enabled.

In the second mode of operation, since RDSEL=1, the multiplexer 54 selects the output of the multiplexer 50, which in turn selects one of the groups of data bits D0–D127 in accordance with the value of the configuration control signals Q3–Q1. It can be seen that, in this mode, the data bits D0–D127 are fed to the rows of the array with the corresponding logical addresses i.e. D0 is applied to the row with address 0, D1 is applied to the row with address 1 and so on.

SOME POSSIBLE MODIFICATIONS

In the arrangement described above, each of the sections S1 etc. may be a separate physical unit, e.g. each section may be housed in a separate cabinet. However, in an alternative form of the invention, two or more sections may be housed in the same cabinet.

Also, in the arrangement described above, the by-passing of a section is achieved by the action of its two neighbouring sections in selecting the by-pass path between them; it is not necessary for the by-passed section itself to take any action. The advantage of this is that, even if the power supply to a section fails completely, that section can still be by-passed and hence the rest of the system can still operate (assuming that each section has its own separate power supply arrangement). Moreover, the by-passed section can be completely isolated from the rest of the system, for testing and repair. However, in an alternative form of the invention, the switching circuits for by-passing a section may be part of the same physical unit as the section itself. This would simplify the switching arrangements and the connections between the units, but would mean that a section could not be by-passed if its power supply failed.

An alternative embodiment of the invention, incorporating these modifications, will now be described with reference to FIG. 5.

Figure 5:
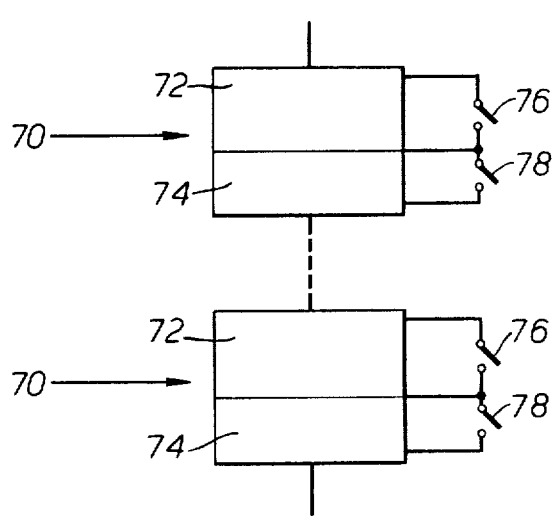
FIG. 5 is an alternate embodiment of the invention.

FIG. 5 shows a data processing system comprising six physical units 70, each of which contains twenty-four rows of processing elements. The rows in each unit are grouped into a first section 72 of sixteen rows, and a second section 74 of eight rows. These sections can be by-passed (or short-circuited) by operating respective switching circuits 76 and 78.

In operation, any one of the 16-row sections 72, or alternatively any two of the 8-row sections 74, can be by-passed so as to act as a stand-by, leaving 128 rows operating normally.

I claim:

1. An array processor having a plurality of sections of processing elements, and means for allocating a unique address to each section in a continuous sequence, comprising:
   (a) at least three sections, each section comprising a plurality of processing elements connected together in a predetermined pattern,
   (b) connection means coupled to said sections, for connecting said sections together in series,
   (c) by-pass means coupled to said sections and operable to by-pass any selected one of said sections by directly interconnecting the sections on opposite sides of said selected section, thereby isolating said selected section from the other said sections, said by-pass means being operable only upon selection of said selected section, and
   (d) means for variably allocating a continuous sequence of addresses to respective ones of said sections other than said selected one of said sections, at least some of said addresses being reallocated in said continuous sequence upon selection of said selected one of said sections whereby the sequence of said unique addresses in said continuous sequence is not altered upon the bypass of said selected section.

2. An array processor according to claim 1 further comprising:
   (a) a master control unit
   (b) a plurality of sets of control lines connecting the master control unit to respective ones of said sections, for carrying addresses allocated to said sections by the master control unit, and
   (c) a common address bus connecting the master control unit to all said sections in parallel,
   (d) wherein each section comprises comparison means connected to the common address bus and to the respective control lines, for comparing signals on said bus and control lines.

3. An array processor comprising:
   (a) at least three sections, each section comprising a plurality of processing elements connected together in a predetermined pattern,
   (b) connection means coupled to said sections, for connecting said sections together in series,
   (c) by-pass means coupled to said sections and operable to by-pass any selected one of said sections by directly interconnecting the sections in opposite sides of said selected section, thereby isolating said selected section from the other said sections, said by-pass means being operable only upon selection of said selected section, and
   (d) a plurality of test signal inputs,
   (e) a data source,
   (f) a plurality of sets of data input lines connected to said data source, and
   (g) means for connecting said selected one of the sections to the test signal inputs upon isolation of said selected one of said sections by said by-pass means and for connecting the other said sections to respective sets of the data input lines.

* * * * *